A. P. TORREY.
AIR CONDITIONING PROCESS AND APPARATUS.
APPLICATION FILED APR. 27, 1920.

1,374,689. Patented Apr. 12, 1921.

ON LINE. 2-2. FIG.1.

INVENTOR
Anthony P. Torrey,
BY
Robert M. Barr.
ATTORNEY

UNITED STATES PATENT OFFICE.

ANTHONY P. TORREY, OF NORTH GLENSIDE, PENNSYLVANIA.

AIR-CONDITIONING PROCESS AND APPARATUS.

1,374,689.          Specification of Letters Patent.      Patented Apr. 12, 1921.

Application filed April 27, 1920. Serial No. 376,980.

*To all whom it may concern:*

Be it known that I, ANTHONY P. TORREY, a citizen of the United States, and a resident of North Glenside, county of Montgomery, State of Pennsylvania, have invented certain new and useful Improvements in Air-Conditioning Processes and Apparatus, of which the following is a specification.

Some of the objects of the present invention are to provide a process and apparatus for heating and treating air for use in sterilizing processes, dehydrating processes, driers and any other apparatus where purified air at a relatively high temperature is required; to provide means for utilizing in a drying apparatus the maximum heat units available in a heater and the waste products therefrom; to provide means for heating treated air under pressure to a relatively high uniform temperature; to provide an apparatus for conditioning air for the purpose of treating cereals, grains, vegetables or other food products to remove water therefrom without affecting their food value, and to destroy bacteria or other germs of lower organisms which may be present in such products, and to provide other improvements as will hereinafter appear.

Figure 1:
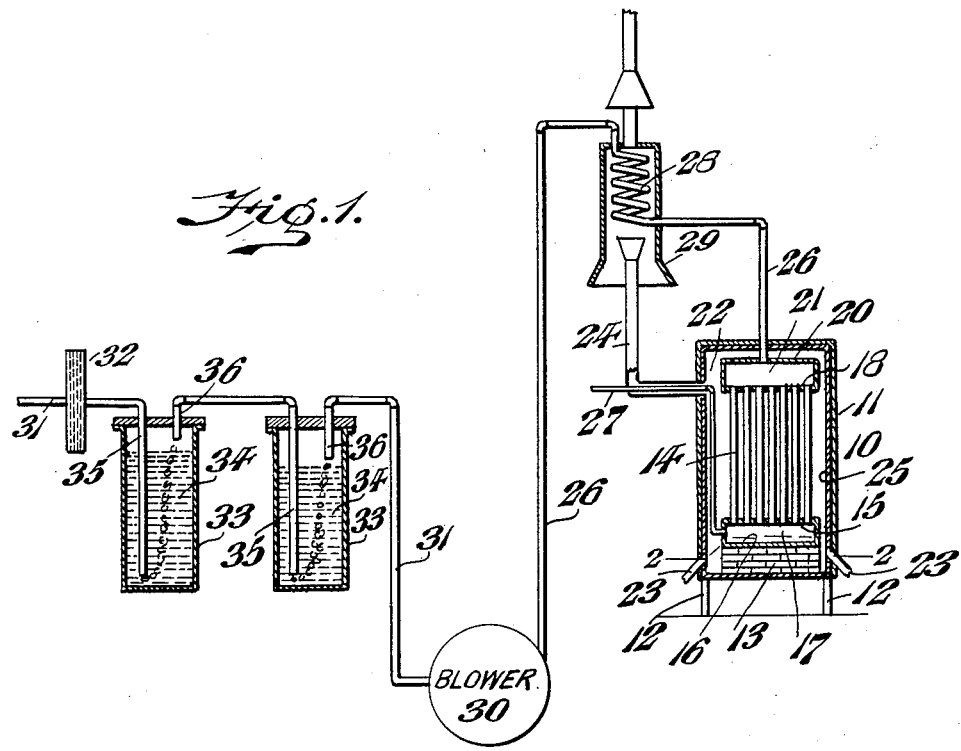
Figure 2:
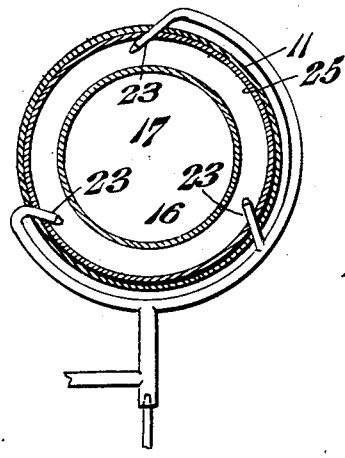
Figure 3:
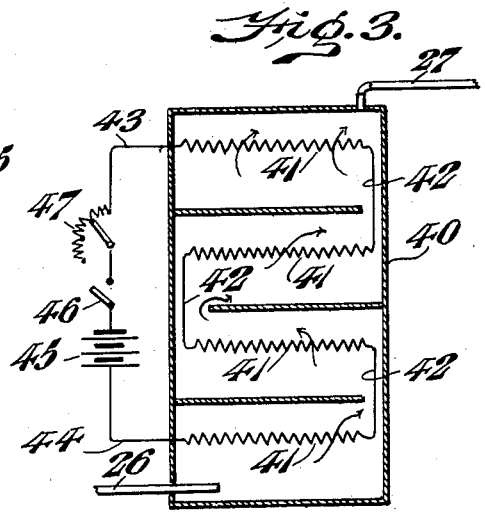

In the accompanying drawings Figure 1 represents an elevation, partly in section, of one form of apparatus embodying the present invention; Fig. 2 represents a section on line 2—2 of Fig. 1; and Fig. 3 represents a sectional elevation of a modified form of heater for use in carrying out the process of the invention.

Referring to the drawings one form of the present invention is shown in Fig. 1, comprising an apparatus for carrying out the process of treating and conditioning air for dehydrating apparatus, for sterilizing, for driers, for purification of cereals and liquids, and for any other purpose where where treated air in a heated condition is required.

For the purpose of heating a body of air in the present process, a heater 10 of any type suitable is employed, this consisting in the preferred form of an outer casing 11 mounted on legs or a base 12 and having a fire brick support 13, which carries a plurality of vertically disposed air conveying tubes 14. The lower ends of the tubes 14 are secured to a header 15 which forms, with a lower drum 16, a delivery chamber 17 with which the tubes 14 are in communication. The upper ends of the tubes 14 are secured to header 18, which forms with an upper drum 20 a receiving chamber 21 with which the tubes 14 are in communication. The two drums 16 and 20 with the tubes 14 form a complete structure located within and spaced from the walls of the casing 11, this surrounding space providing a combustion chamber 22 for the products of combustion which pass upwardly around and between the tubes 14. In the present instance a plurality of gas burners 23 are suitably located at the bottom portion of the casing 11 and are arranged to direct their respective flames in the same direction and substantially tangential so that the products have a swirling action around the tubes 14 and ascend to the upper portion of the chamber 22 where an outlet flue 24 carries off the waste products. The casing 11 is preferably provided with a suitable heat retaining lining 25, such as fire brick or other material suitable for the purpose.

In order to deliver and circulate air through the tubes 14, the drum 20 is in communication with an air supply pipe 26, while the drum 16 is in communication with a delivery pipe 27, which preferably extends through a portion of the combustion chamber 22 and carries to a point of use.

For the purpose of increasing the efficiency of the heating step and utilizing the maximum heat units available, the air supply pipe 26 is provided at a suitable point in its length with a coil 28 which is located in an enlarged hood 29 surrounding the flue 24, this latter being broken so that secondary air can enter the lower open end of the hood 29 and promote combustion about the coil 28, whereby the air is preheated.

As a means for delivering air to the heating apparatus under pressure, a blower or compressor 30 is arranged with its outlet in communication with the supply pipe 26, while the inlet side of the pressure producing means is in communication with a receiving pipe 31, which leads to a suitable source of air. In the present instance the air delivered to the pipe 31 is initially conditioned by the removal of dust, or particles held in suspension, or any other deleterious substances by successively causing the air to pass through a suitable filter 32 of gauze, or any other material of the required nature, and through air tight containers 33 having a body of water 34 or other liquid therein respectively. From these last the air enters the blower 30. The receiving pipe 31 is provided with depending inlet sections 35 extending respectively below the level of the liquid in the containers 33, and outlet sections 36, respectively communicating with the space above such liquid levels as will be understood. The air thus comes from its source and passes successively through the filtering means under the action of the blower 30 and is delivered under pressure to the high temperature heating apparatus.

In the form of heater shown in Fig. 3, the air supply pipe 26 preferably enters at or near the bottom of a closed casing 40, so that the air is liberated within the casing 40 and ascends to be delivered at or near the top to the pipe 27, which extends to the point of use.

For heating the air within the casing 40, a plurality of heating coils 41 are arranged in planes spaced one above the other, each plane of coils extending transversely of the casing 40 and having an end coil connected by a conductor 42 to an end coil of the next adjacent plane of coils 41. The several series of coils are thus connected in electrical series and have terminal wires 43 and 44 passing outside of the casing 40 and connected to opposite poles of a source of current, such as a battery 45. A switch 46 may be provided for closing and opening the circuit, and a rheostat 47 may be used to regulate the heating of the coils.

In order to cause the air to be held in contact with the heating coils 41 to effectively absorb heat therefrom, a plurality of baffles 50 are arranged in alternately projecting relation upon the opposite side walls of the casing 40, so that the air traverses a tortuous path upward and laterally through the heating coils as indicated by the arrows in Fig. 3.

From the foregoing it will be apparent that the air being heated is always traversing channels or circulating passages which, while located in a heat zone, do not have any communication with the combustion chamber or any space containing products of combustion. By this construction the conditioned air is maintained in its purified state and is delivered to the point of use.

While the present form of the invention includes a blower for circulating the air under a change in volume, it is to be understood that this may be accomplished in several ways and the invention is not restricted to that here shown by way of example.

While but two of the many forms of the present invention have been here shown, it is to be understood that the invention is not limited to any specific construction but might be applied in various forms without departing from the spirit of the invention or the scope of the appended claims.

Having now fully described my invention what I claim is:—

1. The process of conditioning air which consists in passing a body of air through a liquid, then subjecting said air to pressure, heating the compressed air at a relatively high temperature, and utilizing the air in its heated condition.

2. The process of conditioning air which consists in filtering a body of air, then passing the filtered air through a liquid, subjecting the purified air to pressure, heating the compressed air at a relatively high temperature, and utilizing the air in its highly heated condition.

3. In an apparatus for conditioning air for use in dehydrating and sterilizing processes, a casing forming a combustion chamber, a heat producing means in said chamber, a plurality of tubes supported in said combustion chamber, means for causing air to be circulated through said tubes to be heated, a delivery pipe for conveying the heated air to a point of use, and means for purifying said air.

4. In an apparatus for conditioning air for use in dehydrating and sterilizing processes, a casing forming a combustion chamber, a heat producing means in said chamber, means for causing the products of combustion to have a swirling motion through said chamber, a plurality of tubes supported in said combustion chamber, means for causing air to be circulated through said tubes to be heated, a delivery pipe for conveying the heated air to a point of use, and means for purifying said air.

5. In an apparatus for conditioning air, a casing forming a combustion chamber, a heat producing means in said combustion chamber, a plurality of tubes in said chamber having communication at one end with an air supply pipe, and at the other end with an air discharge pipe, means for supplying compressed air to said supply pipe, a flue for waste products of combustion, and a coil formed in said supply pipe and located in said flue for preheating the air supplied to said tubes.

6. In an apparatus for conditioning air, a casing forming a combustion chamber, a heat producing means in said chamber, a plurality of tubes in said chamber having communication at one end with an air supply pipe, and at the other end with an air delivery pipe, means for supplying compressed air to said supply pipe, a flue for waste products of combustion, a coil formed in said supply pipe and located in said flue for preheating the air supplied to said tubes, and means for successively filtering the air supply.

7. In an apparatus for conditioning air, a casing forming a combustion chamber, a heat producing means in said chamber, means for circulating air through said combustion chamber out of contact with products of combustion, a delivery pipe for conveying the heated air from said means to a point of use, and means for purifying said air.

8. In an apparatus for conditioning air, a casing forming a combustion chamber, a heat producing means in said chamber, a plurality of tubes in said chamber having communication at one end with an air supply pipe, and at the other end with an air delivery pipe, means for circulating air through said tubes, a flue for waste products of combustion, means for preheating the air from said waste products, and means for successively filtering the air supply.

In witness whereof I have hereunto set my hand this 20th day of April, 1920.

ANTHONY P. TORREY.